No. 840,005. PATENTED JAN. 1, 1907.
A. M. MATTICE.
TESTING DEVICE.
APPLICATION FILED JAN. 11, 1906.
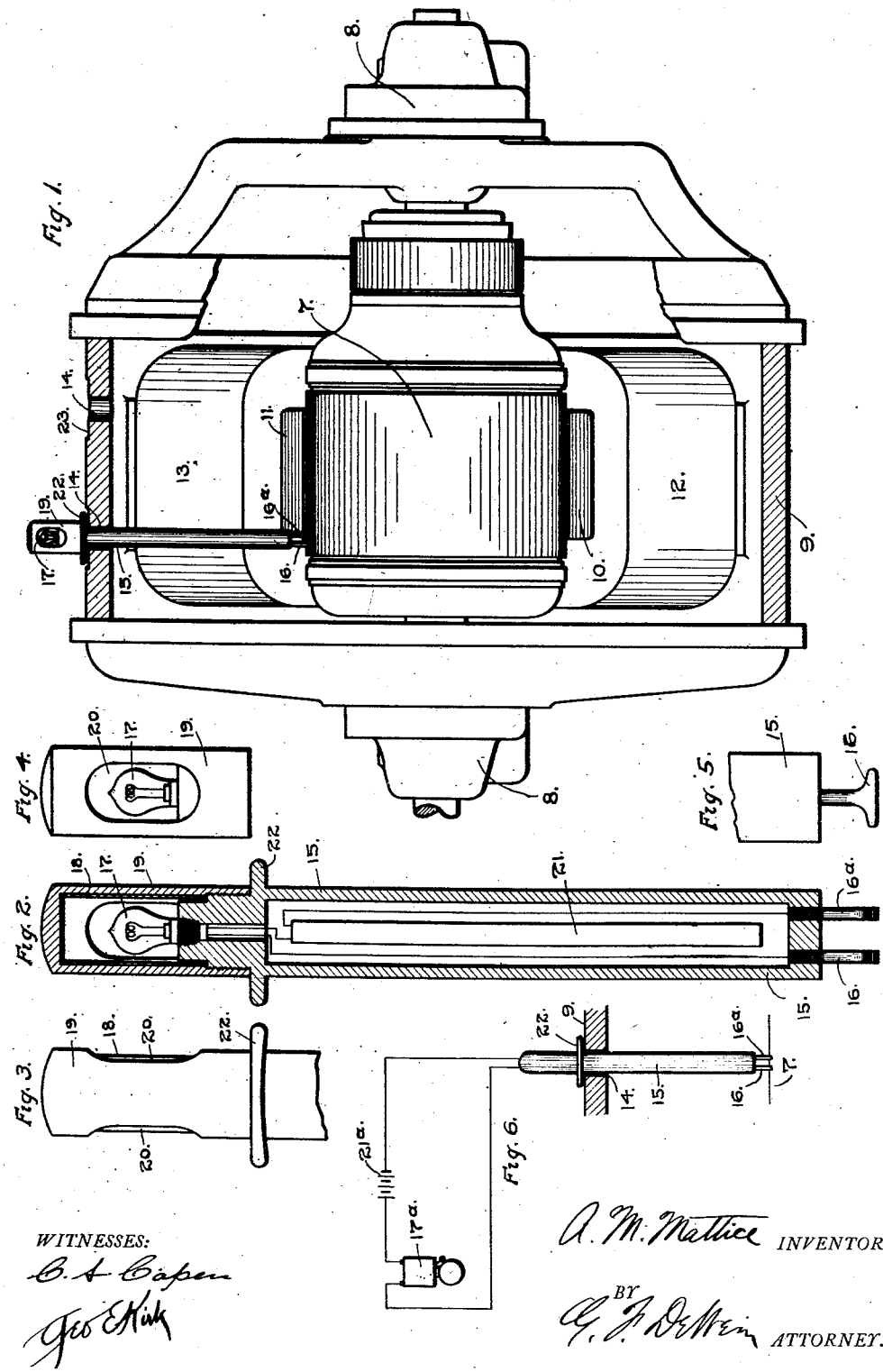
WITNESSES:
C. A. Capen
Geo E Kirk
A. M. Mattice INVENTOR
BY
G. F. DeWein ATTORNEY.

UNITED STATES PATENT OFFICE.

ASA M. MATTICE, OF MILWAUKEE, WISCONSIN, ASSIGNOR TO ALLIS-CHALMERS COMPANY, OF MILWAUKEE, WISCONSIN, A CORPORATION OF NEW JERSEY.

TESTING DEVICE.

No. 840,005.  Specification of Letters Patent.  Patented Jan. 1, 1907.

Application filed January 11, 1906. Serial No. 295,541.

*To all whom it may concern:*

Be it known that I, ASA M. MATTICE, a citizen of the United States, residing at Milwaukee, in the county of Milwaukee and State of Wisconsin, have invented certain new and useful Improvements in Testing Devices, of which the following is a specification.

My present invention relates to means for testing the extent of wear of motor-journals and the position of the rotatable member of a motor relative to its poles.

It very often happens that the journals of motors, especially of motors employed in street-railway work, wear to such an extent that the rotatable member or armature moves close enough to the pole-faces of the motor-field to bear against said faces and damage the armature or its winding very seriously. At the same time a disagreeable noise is produced by the rubbing of the armature on the lower pole-faces.

The object of my invention is to reduce the liability of damage to the motor by providing a simple means for testing the extent of wear of the journals of a motor and for determining the position of the armature or rotatable member of the motor relative to the pole-faces. To this end I employ a portable contact device which is adapted to engage the rotatable member of the motor when the latter is in its proper position, in combination with a source of current-supply, a signal device in circuit with said contact device and said source of supply, and means for preventing said contact device from engaging said rotatable member when the latter is not in its proper position, such as when the journals have worn beyond a predetermined amount.

Although my invention is especially adapted for use for the purpose of inspecting electric-railway equipment, it may be employed in a variety of ways and in connection with various types of motors.

In the accompanying drawings, Figure 1 illustrates a four-pole motor, partly in vertical section, with the armature and my improved testing device in position. Fig. 2 is a vertical section of my testing device in its preferred form. Fig. 3 is a side view, and Fig. 4 a face view, of the upper part of the device shown in Fig. 2. Fig. 5 is a side view of the bottom part of the testing device, showing the preferred form of contact; and Fig. 6 is a modified arrangement of my testing device.

Referring now to the drawings, the motor-armature or rotatable member is indicated at 7. Said armature is mounted in the journals 8, carried by the casing 9. The motor shown in Fig. 1 is a four-pole machine, the poles being arranged ninety degrees apart around the armature. Two of said poles are indicated at 10 and 11 and have mounted thereon, respectively, the coils 12 and 13. Through the upper side of the casing 9 one or more openings 14 are provided, through which my improved contact device may be inserted for the purpose of determining the position of the rotatable member or armature within the said casing. The opening may lead to any part of the rotor, or it may even be formed in the box or journal 8 and lead to the shaft.

The contact device is illustrated in Figs. 1 and 2 as a self-contained testing apparatus which is readily portable and, in fact, could be carried around in the pocket of the inspector. It consists of a tube 15, having at one end a pair of contacts 16 and 16$^a$ and at the other end a signaling device, such as an electric lamp 17. This lamp is inclosed by a cylinder, of glass, 18, surrounded by a protecting-hood 19, screwed to the upper end of tube 15. The hood (more clearly shown in Figs. 3 and 4) is provided with openings 20, through which the condition of the lamp 17 may be readily observed. The tube contains a source of current-supply, such as a small dry battery 21. The lower ends of the contacts 16 and 16$^a$ are flanged, as shown in Fig. 5, for the purpose of insuring good contact with the metallic parts of the rotatable member or armature. The part of the motor-casing surrounding the opening 14 is finished at 23 so as to present a smooth flat surface to the under side of the limiting collar or shoulder 22 on tube 15 when the latter is in position in opening 14.

In the modification illustrated in Fig. 6 I have shown the contact device as made up of a rod or tube carrying contacts 16 and 16$^a$ at its lower end and provided with limiting-collar 22. This device, however, is not self-contained, the contacts being connected to a source of current-supply 21ª, and a signaling device, such as bell 17ª, located at any desirable distant point.

In the operation of my improved testing device the tube or rod 15 is projected through the opening 14 in the motor-casing, and, provided the motor-armature is in its proper position, the contacts 16 and 16ª will engage the metallic parts thereof before the collar 22 engages the finished surface 23 surrounding opening 14. An electrical circuit will thus be completed, which may be traced in Fig. 2 as follows: from battery 21, lamp 17, contact 16, metallic part of rotatable member 7, contact 16ª to battery. In Fig. 6 the circuit may be traced from battery 21ª, contact 16ª, metallic part of rotatable member 7, contact 16, electric bell 17ª to battery. In either case a signal is operated which indicates that the armature is in its proper position. If, however, the journals have worn so far as to permit the rotatable member to approach dangerously near the lower pole-faces, such as 10, the collar 22 will rest on the finished surface 23 and prevent the contacts 16 and 16ª engaging the rotatable member. In such a case the electric circuit is not completed, and the inspector is immediately made aware of the condition of affairs.

I aim in the appended claims to cover all modifications which do not involve a departure from the spirit and scope of my invention.

Having thus described my invention, what I desire to claim and to cover by Letters Patent is—

1. As a means for testing the relative position of motor-armature and the pole-faces below same, a portable contact device adapted to engage the armature when the latter is in its proper position, in combination with a source of current-supply, and a signal device in circuit with said contact device and said source of supply, and means for preventing said contact device from engaging the armature when the latter has moved into dangerous proximity to the lower poles of the motor.

2. As a means for testing the extent of wear of the journals of a motor by inserting an indicating device through an opening in the motor-casing, a tube provided with electrical contacts at one end, a signal device at the other end, a source of current-supply within the tube, and a collar for limiting the movement of the tube through the opening in the motor-casing.

3. As a means for determining the position of a motor-armature relative to its pole-faces by inserting an indicating device through an opening in the motor-casing, a pair of contacts, portable means upon which said contacts are mounted adapted to pass through the opening in the motor-casing, a source of current-supply connected to said contacts, and a signaling device connected in circuit with said contacts and said source of current-supply.

4. In combination, a motor having an opening in the upper part of its casing, and means for indicating the position of the rotatable member relative to the poles of said motor, comprising a portable contact device adapted to engage the rotatable member when the latter is in its proper position, a source of current-supply and an indicating device in circuit with said contact device, and means for preventing said contact device from engaging the rotatable member when the latter is not in its proper position or when the journals have worn beyond a predetermined amount.

In testimony whereof I affix my signature in presence of two witnesses.

ASA M. MATTICE.

Witnesses:
G. F. DE WEIN,
JACOB JACOBSEN.